United States Patent [19]

Fodor

[11] 4,215,528
[45] Aug. 5, 1980

[54] RAKE

[75] Inventor: William G. Fodor, Blairs, Va.

[73] Assignee: Sandvik, Inc., Greensboro, N.C.

[21] Appl. No.: 55,705

[22] Filed: Jul. 9, 1979

[51] Int. Cl.³ .............................................. A01D 7/00
[52] U.S. Cl. .................................... 56/400.17; 294/51
[58] Field of Search ...................... 294/51, 57, 49, 59; 56/400.01, 400.04, 400.17, 400.18, 400.19, 400.20, 400.21; 15/159 R, 159 A, 160

[56] References Cited

U.S. PATENT DOCUMENTS

| 2,850,865 | 9/1958 | Anderson | 56/400.17 |
| 3,707,835 | 1/1973 | McNally | 56/400.17 |
| 3,724,188 | 4/1973 | Eads | 56/400.17 |

Primary Examiner—James B. Marbert
Attorney, Agent, or Firm—B. B. Olive

[57] ABSTRACT

An improved lawn rake incorporates a plastic molded head with individually replaceable tines.

2 Claims, 12 Drawing Figures

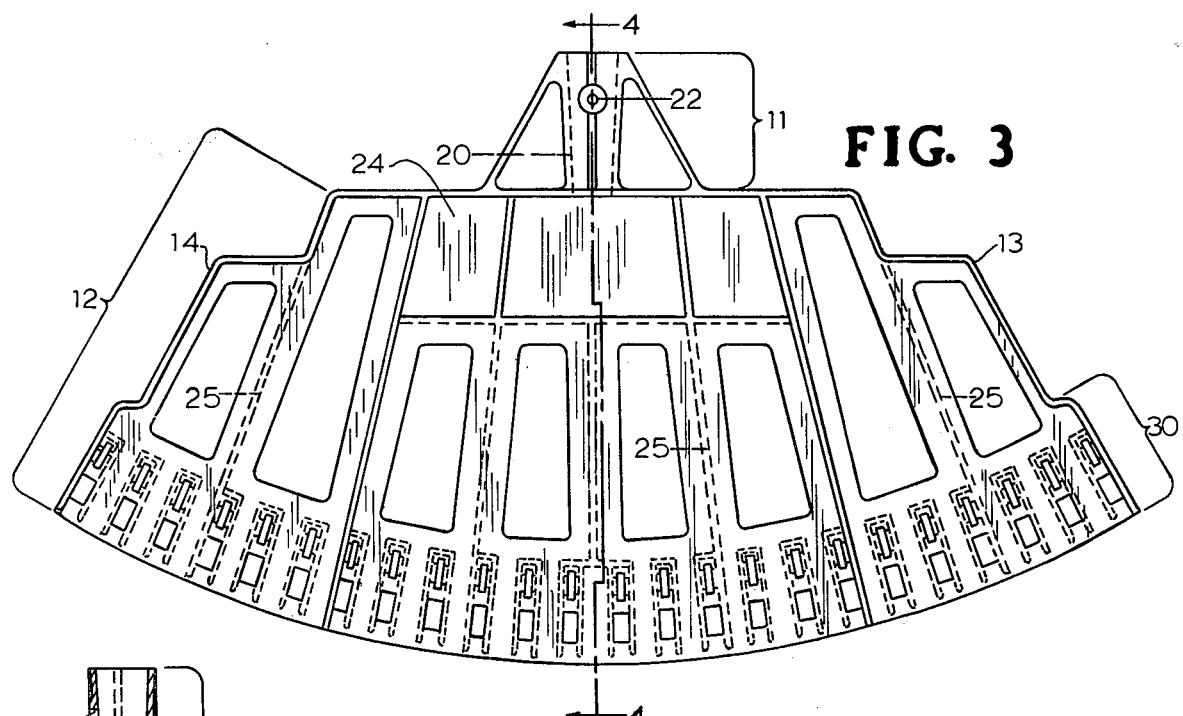
FIG. 3
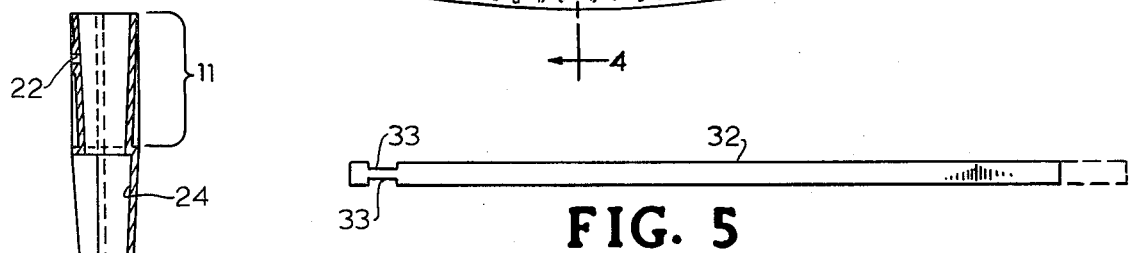
FIG. 5
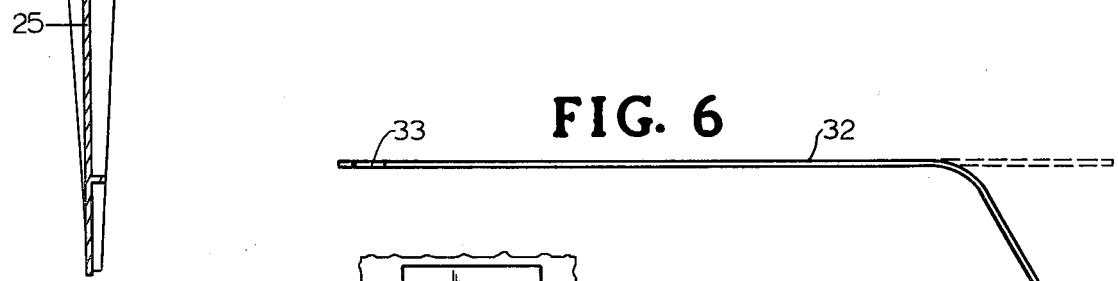
FIG. 6
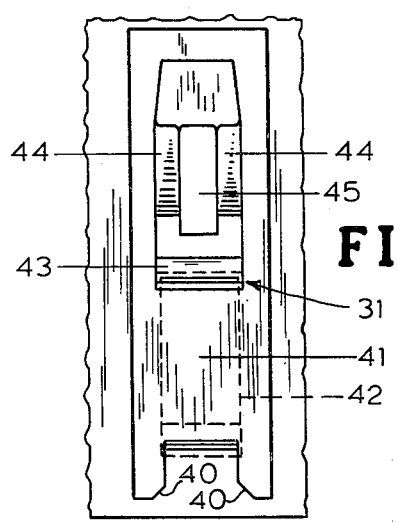
FIG. 4
FIG. 7

RAKE

BACKGROUND OF THE INVENTION

1. Field of the Invention

The invention relates to lawn rakes and more specifically to lawn rakes having molded heads and replaceable tines.

2. History of the Prior Art

Molded plastic heads have been known in the art as exemplified by U.S. Pat. Nos. 3,707,835 and 3,724,188. Such plastic molded heads are desirable for rake constructions because they are economical and durable in nature.

It has also been known to provide replaceable tines as exemplified in U.S. Pat. Nos. 2,193,070 and 2,205,827. The replaceable tine feature is also advantageous because tines are apt to break or become bent in service.

With the foregoing comments and all other known prior art related to rake construction in mind, the prior art has not provided a lawn rake construction utilizing a molded head with desirable flexible features, an easily replaceable tine construction and a head design lends itself to being molded in various sizes to meet the practical demands of the market. Thus, the provision of a rake construction satisfying these requirements is the primary object of the invention. Other objects will become apparent as the description proceeds.

SUMMARY OF THE INVENTION

The invention comprises a lawn rake construction having a plastic molded head with a molded handle receptacle and molded tine receptacles in a forward arcuate edge portion. The upper end of each tine and the individual tine receptacle are designed such that the tine can be cammed into place and easily removed by use of a screwdriver, punch or similar hand tool.

The molded head of the rake may be formed either in a radial-like shape as disclosed or in a broom-like shape according to conventional practices. The design of the molded head of the rake is also of such nature that by making relatively simple changes in the molding operation, the width of the rake can be reduced so as to provide for a reduced number of tines while maintaining an attractive appearance in the reduced size rake. The rake head of the invention also incorporates a ribbed construction interspersed with openings between the ribs and formed in a manner to provide desirable flexing characteristics in use.

DESCRIPTION OF THE DRAWINGS

FIG. 3 is a bottom plan view of the rake head of FIG. 2.

FIG. 4 is a section view taken along line 4—4 of FIG. 3.

FIG. 5 is a top plan view of a universal removable tine employed in the rake invention with the shape of the tine prior to bending being indicated in dashed lines.

FIG. 6 is a side elevation view of the tine of FIG. 5.

FIG. 7 is an enlarged fragmentary plan view of the one of the tine receiving pockets.

DESCRIPTION OF THE PREFERRED EMBODIMENT

Figure 1:
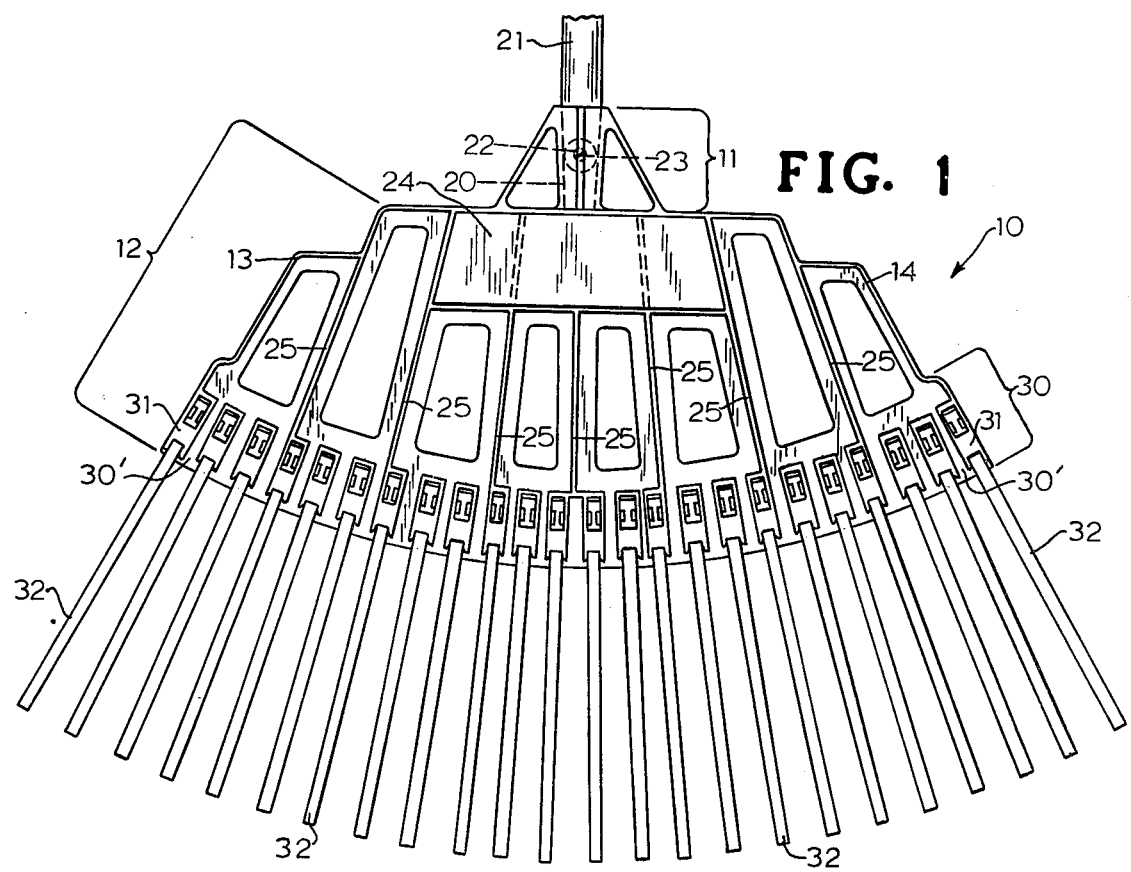
FIG. 1 is a top plan view of a rake embodying the preferred embodiment of the present invention.

Referring initially to FIGS. 1 through 11, there is shown a leaf rake head generally indicated at 10 and illustrating the features of the invention in a preferred embodiment. Rake head 10 is molded as a single, unitary structure of a suitable plastic material such as polypropylene or the like. In the illustrated embodiment, rake head 10 is illustrated as being of a conventional radial shaped configuration although it will be understood that rake head 10 could assume a so-called broom or other conventional shape. The broom shape, in contrast to the illustrated embodiment, would provide for the outer periphery of the tines to be aligned along an essentially straight line rather than in a radial form as illustrated.

Rake head 10 is made up of a handle-engaging portion 11 and a tine-mounting portion 12 combined in a single integrally-molded unitary structure.

The handle-engaging portion 11 is designed to provide a convenient means for receiving and securing the handle 21 during assembly and is of rigid construction suited to withstanding the usual forces that are applied thereto by the user. A centrally-located, elongated, longitudinally extending socket portion 20 in handle portion 11 is tapered inwardly and shaped to conform to the end of handle 21 which is maintained in place within socket portion 20 by the locking action of the taper and additionally by a suitable screw 22 passed through hole 23 into the secured end of handle 21.

Handle portion 11 is intentionally formed to be substantially more rigid and therefore more resistive to being flexed than is tine mounting portion 21. A transverse, substantially rectangular plate or web 24 appended to and located forwardly of handle portion 11 is also substantially rigid in construction. Ribs 25 radiate from a lower edge of plate 24 and also extend along the sides thereof as illustrated. Plate 24 provides both rigidity in the upper portion of head 10 and also provides a convenient location for placement of a molded or imprinted trademark, emblem, or the like.

As best seen in FIGS. 4–7, ribs 25 have a substantially greater thickness at their upper end, below and to the side of plate 24 and help provide rigidity for the upper handle portion 11 of head 10. However, ribs 25 are tapered in the direction of the tines so that a more flexible character is imparted to the tine-mounting portion 12 towards the ground-engaging end of rake head 10. This feature is best illustrated in FIG. 4. Due to the described tapering design of ribs 25 through the central area of the tine-mounting portion 12, this central area thus has an inherent flexibility molded therein. The tine-mounting portion 12 also includes, as illustrated, an arcuate tine holder section 30 molded integral with ribs 25 and provided with tine-receiving pockets 31 molded therein separated and connected together by intervening web portions 31'. Pockets 31 are relatively thick as compared to the thickness of the intervening webs 31' so as to provide rigidity in the immediate area in which the respective tines 32 are secured in place. As illustrated in FIGS. 1–11, rake head 10 is shown as a 24-tine model although other tine clusters may be employed.

Figure 9:
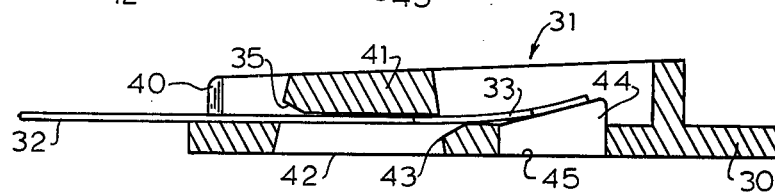
FIG. 9 is a section view similar to that of FIG. 8 but with a tine partly inserted in the tine pocket.
Figure 10:
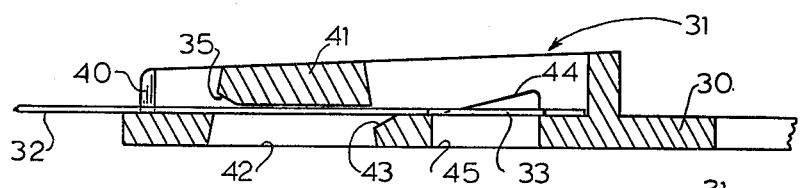
FIG. 10 is a section view similar to that of FIGS. 8 and 9 but with the tine fully inserted into the tine pocket.
Figure 11:
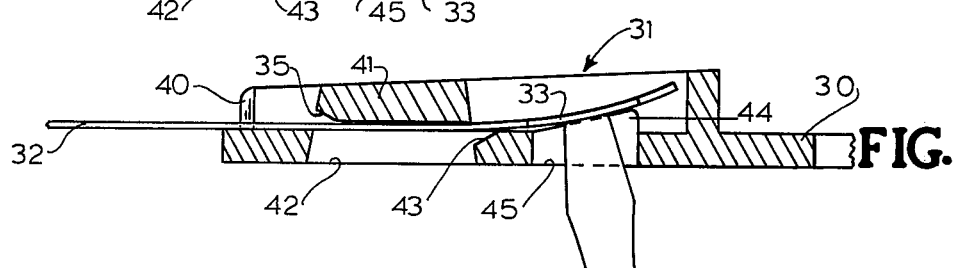
FIG. 11 is a section view similar to that of FIG. 10 but illustrating the means for removal of the tine should it become necessary to replace the tine due to being deformed or broken during use.

Tines 32 lend themselves to being of uniform construction and are designed to be readily removable from and interchangeable with any of the pockets 31 by a simple manual operation. Thus, any tine 32 can be replaced by a universal or interchangeable tine having the same tine-mounting connection when any such tine becomes deformed, broken or otherwise damaged during use. Tines 32 are preferably stamped from any suitable metal or formed from plastic, fiberglass or the like and the necessary curvature is provided to the ground-engaging end as seen in FIGS. 5–6. The mounting ends of tines 32 are provided with notches 33 which may be punched therein and whose function is later described. The entrance surfaces for each pocket 31 are appropriately beveled as indicated by the inwardly beveled sides 40 and the beveled lateral surface 35. Such beveling facilitates installation and replacement of the tines. The mounted end of tine 32 during installation is moved into its respective pocket 31 and passes beneath the top structure 41 of the respective pocket 31 and over a bottom opening 42 molded into each pocket 31. The mounted end of tine 32 then engages a lateral beveled surface 43 and rides up thereon onto a pair of opposed cam surfaces 44 on either side of an additional bottom opening 45 formed in the pocket 31 as seen in FIG. 9. Once the entering mounted end of tine 32 is at the peak of the cam surfaces 44, the end of the tine 32 snaps in place and returns to a flat position with the notches 33 residing between and engaging the respective cam surfaces 44 as best seen in FIG. 10. Once so installed, it will be seen that the mounted end of the respective tine 32 is detachably but securely retained in the respective pocket 31 and in a relatively flat condition with the cam surfaces 44 being located within the notches 33. As previously mentioned, the rake construction of the invention contemplates that a tine 32 may be deformed, broken or otherwise damaged in such a way as to render it unserviceable in use and therefore provides a means for simple replacement of the same. Thus, as illustrated in FIG. 11, a screwdriver, or the like, may be inserted into opening 45 beneath the locked end of the tine 32 to be replaced and this end of the tine may be forced upward as illustrated in FIG. 11 so that it clears the peak of the respective cam surfaces 44. The respective tine 32 may then be pulled from within pocket 31 once positioned as illustrated in FIG. 11. Removal of the damaged tine 32 is thus an extremely easy and simple operation and may be carried out any time a tine 32 is deformed, broker, or otherwise requires replacement with a new tine.

Figure 2:
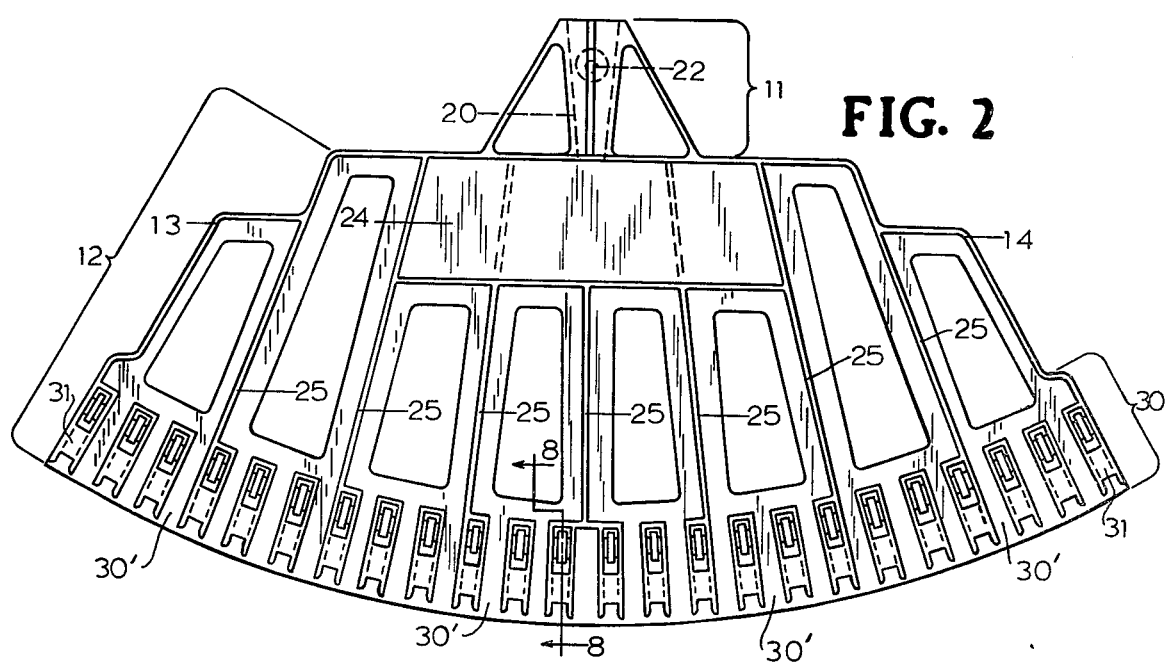
FIG. 2 is a top plan view of the rake head of the invention.
Figure 8:
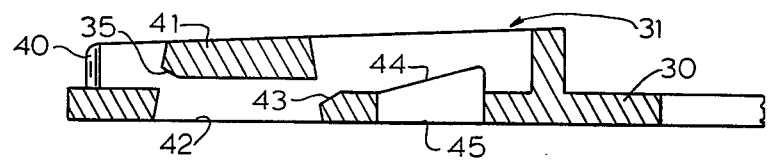
FIG. 8 is an enlarged section view taken along line 8—8 of FIG. 2.
Figure 12:
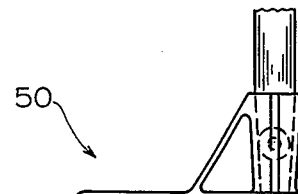
FIG. 12 is a top plan view of a rake according to a second embodiment of the invention.

Mass manufacture and sale of garden rakes has indicated a need for the manufacturer to provide rakes of different sizes with different numbers of tines. The rake head 10 of the invention is uniquely designed to meet this need. In this regard, it may be noted that the rake head 10 illustrated in FIGS. 1–3 is provided with twenty-four tines in contrast to the rake head 50 illustrated in FIG. 12 as having eighteen tines and being of lesser width. Moreover, it should be noted that the rake configuration illustrated in FIG. 12 is basically included in the rake configuration illustrated in FIGS. 1–3. In this regard, note should be taken that the tine-mounting portion 12 of rake head 10 illustrated in FIGS. 1–3 includes outer wing portions 13, 14 which are integrally molded with the central body of the tine-mounting portion 12. Each such wing portion 13, 14 is designed in the illustrated embodiment to receive three of the tines for the assembled twenty-four tine rake shown in FIGS. 1–3. Conversion of the relatively large rake size illustrated in FIGS. 1–3 to the relatively reduced rake size illustrated in FIG. 12 may be accomplished simply by placing blanks in the mold for head 10 in the area of the wing portions 13, 14 so as to allow the same basic mold to be used to mold the smaller but still attractive rake head 50 having eighteen tines as illustrated in FIG. 12. The expensive molding equipment, thus, may be used with a common mold to achieve more than one type of rake head within the same mold by following the unique design of the invention. Furthermore, in both of the illustrated eighteen and twenty-four tine models, the outwardly increasing flexibility of the rake head in the direction of the tines is maintained along with the rigidity of the handle-engaging portion 11. The tapered rib construction, thus, allows for the desired flexibility while maintaining the tines in their proper alignment.

From the foregoing description, it can be seen that there has been provided a rake head construction which is capable of being economically formed by molding the same as a unitary structure utilizing polypropylene, or the like. Furthermore, the design of the invention permits molding of more than one rake head shape and size from the same mold while still retaining a comfortable, relatively light and attractive appearance in the final rake product. The structural tapering of the rib elements of the unitary rake head structure permits the rake head to perform its intended functions and still provide flexibility without failure due to breakage or fatigue. Also, the rake head of the invention allows for ease of replacement of deformed, broken, or otherwise damaged tines by the user and with dramatic improvement over prior rake structures having more complicated tine replacement structure and more difficult and awkward replacement procedures associated therewith.

What is claimed is:

1. A lawn rake comprising, in combination:
   (a) a tine receiving rake head molded of a plastic material as an integral unitary structure having a handle engaging portion and a tine mounting portion molded integrally as a single structure, said handle engaging portion including a generally centrally located elongated longitudinally extending socket portion for receiving therein one end of a handle, said tine mounting portion extending transversely from said socket portion and having an arcuate forward edge portion, rib formations separated by openings through said tine mounting portion and formed on both top and bottom sides of said tine mounting portion, said rib formations being tapered from a maximum thickness adjacent the said handle socket portion to a minimum thickness adjacent said arcuate forward edge portion with strength and rigidity being maintained in the area of the handle socket portion enabling said tine mounting portion to exhibit increasing flexibility in the direction of said arcuate forward edge portion, laterally spaced tine receiving pockets formed on said arcuate forward edge portion and having thickness added in the area of tine securement, said tine pockets each being provided with a camming structure formed therein on either side on an opening accessible from the outside of said arcuate forward edge portion for detachably securing ends of respective tines therein locked in one position being accessible to a tool such as a screwdriver whereby such secured ends may be flexed to another position and withdrawn for easy removal and replacement of damaged tines therefrom;
(b) a handle rigidly secured in said pocket portion; and
(c) a plurality of individual tines removably spaced transversely along said arcuate forward edge portion in said tine pockets and extending outwardly therefrom, each of said tines being of universal configuration and adapted to fit in any of said tine pockets, each said tine at its mounted end including a pair of opposite outwardly opening notches adapted to ride over and engage said camming means to removably secure the mounted end of said tine in said pocket subject to being removed by being flexed over said camming means by a said tool inserted through said opening.

2. A lawn rake as claimed in claim 1 wherein said tine mounting portion includes a central portion and a pair of wing portions formed in such manner that by installing blanks in the mold utilized for molding said tine mounting portion only said central portion is molded and provides for a reduced number of tines or in the alternative without said blanks, said rake is molded with a greater number of tines including tines mounted in both said central and wing portions.

* * * * *